Nov. 22, 1949    A. E. W. JOHNSON ET AL    2,488,543
HARVESTER
Original Filed Dec. 23, 1942    3 Sheets-Sheet 1
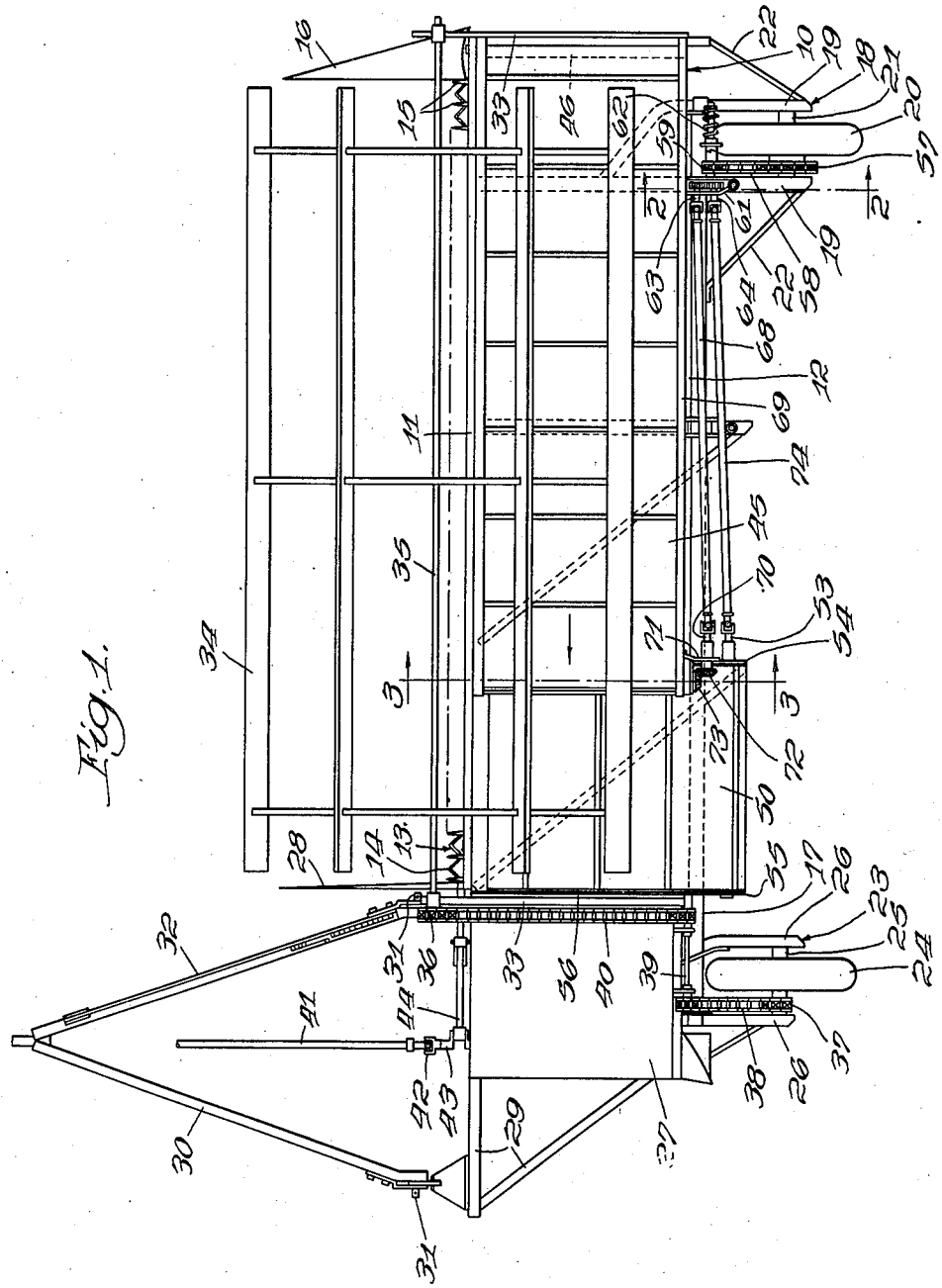
Inventors:
Arnold E. W. Johnson
and Charles F. Crumb.
By Paul O. Pippel Sr.
Atty.

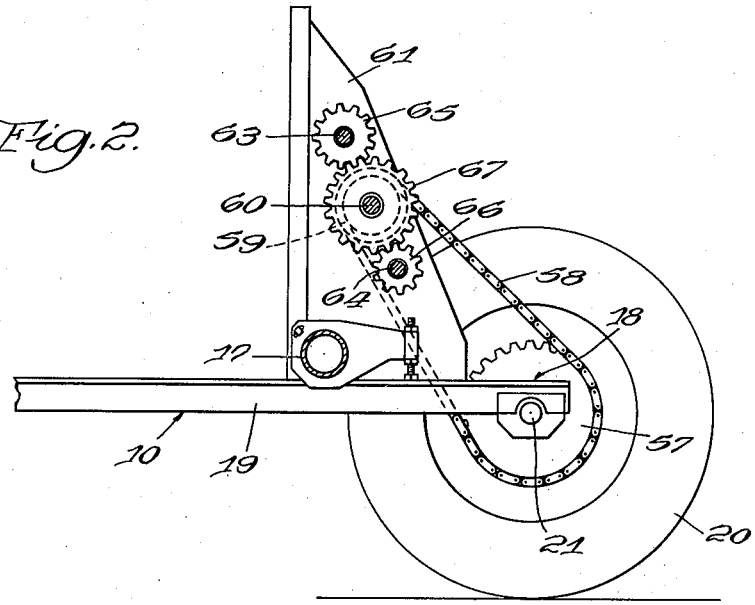
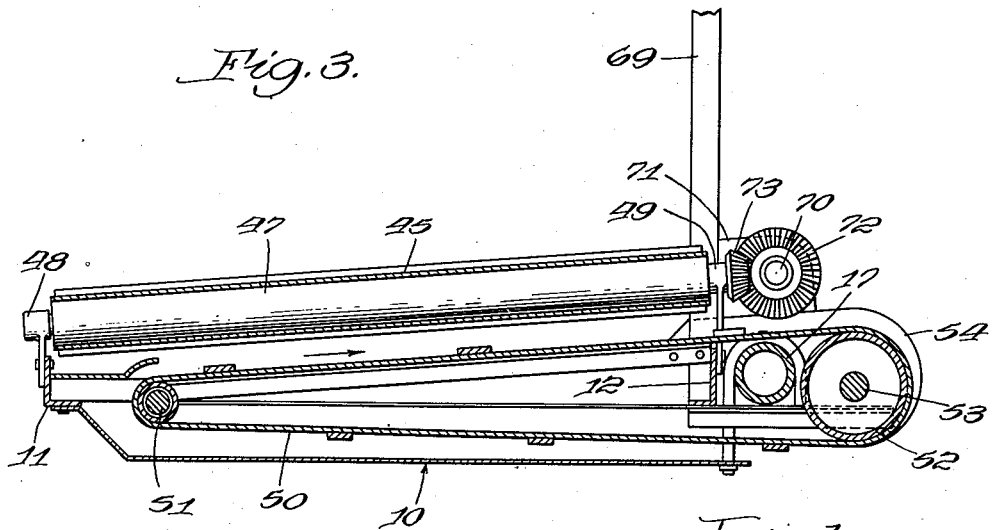

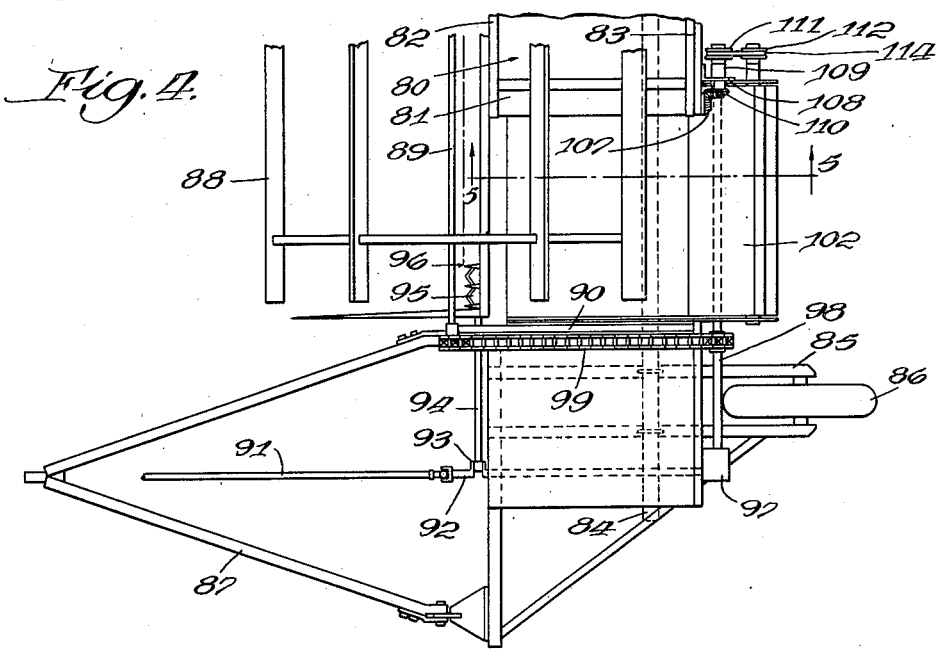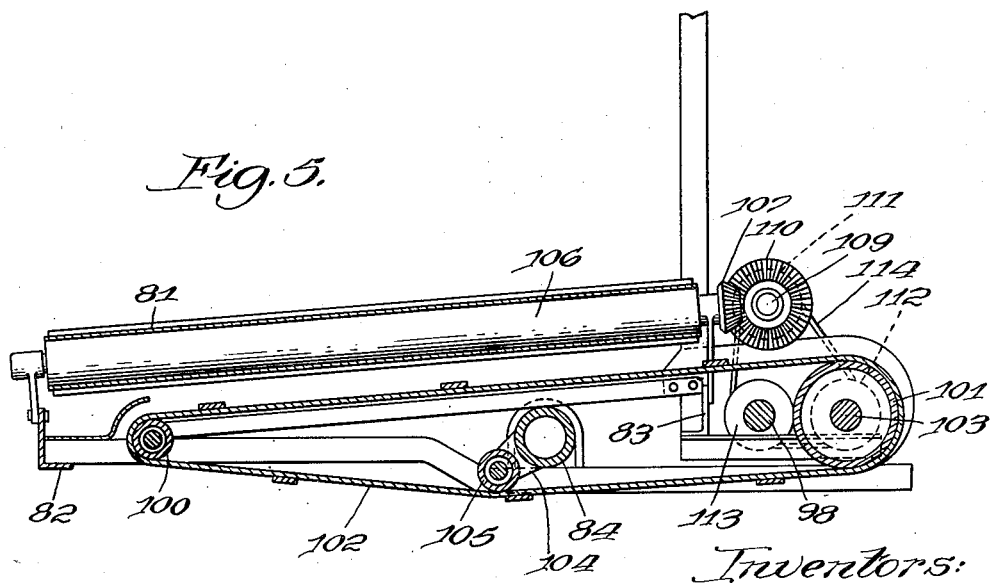

Patented Nov. 22, 1949

2,488,543

UNITED STATES PATENT OFFICE 2,488,543

HARVESTER

Arnold E. W. Johnson, Oak Park, Ill., and Charles F. Crumb, deceased, late of Clarendon Hills, Ill., by Helma Katherine Crumb, administratrix, Clarendon Hills, Ill., assignors to International Harvester Company, a corporation of New Jersey Continuation of application Serial No. 469,870, December 23, 1942. This application June 16, 1945, Serial No. 599,803

13 Claims. (Cl. 56—186)

This application is a continuation of our copending application Serial No. 469,870, filed December 23, 1942, for "Harvester," allowed December 23, 1944, and the invention herein relates to a harvester. More particularly, the invention is concerned with improvements in means for supporting the harvester structure and with means for the discharge of harvested material.

In one form of conventional harvester of the windrower type, the harvested material is cut, deposited upon the laterally running apron, and discharged in windrows at one end of the machine. Several disadvantages are inherent in an arrangement of this type, especially when the harvester is drawn by a tractor, in which case it has been found that the tractor wheels run down the stubble generally at the discharge end of the harvester apron. This results in the discharge of material into the ruts formed by the tractor wheels, with the result that the windrow does not dry properly and it is difficult to pick up or gather the material so discharged.

Constructions have heretofore been provided for the discharge of material rearwardly of the harvester, so that the discharge occurs upon stubble that has not been previously broken down by tractor or harvester wheels. However, because of certain fundamental characteristics of the design of harvesters in general, these discharging means have proved unsatisfactory.

The principal object of the present invention is to provide improved means for the discharging of harvested material.

An important object is to provide for the discharge of material rearwardly of the harvester and in such a position that the material is not affected by travel of either the harvester or its draft vehicle.

Another object of the invention is to provide an improved discharge means for a harvester of the type in which the harvesting platform is supported on a transverse support, the discharge means being so arranged as to discharge material over and rearwardly of the support.

Another object of the invention is to provide improved driving means for the various parts of the harvester.

A still further object of the invention is to provide improved supporting means for the harvester platform and preferably to provide this supporting means in the form of a transverse torsion-resisting member arranged between the longitudinally spaced front and rear portions of the harvester platform, whereby the platform will be substantially torsionally balanced on the supporting member.

Further objects of the invention are to associate the discharging means with the last-mentioned construction and to provide improved driving means for the discharge means and other parts of the harvester.

Other objects and desirable features of the invention will become apparent as the disclosure is more fully made in the following detailed description and accompanying sheets of drawings, in which:

Figure 1 is a plan view of one form of harvester embodying a preferred form of the invention;

Figure 2 is an enlarged sectional view taken substantially on the line 2—2 of Figure 1;

Figure 3 is an enlarged sectional view taken on the line 3—3 of Figure 1;

Figure 4 is a plan view of one end of a harvester embodying a modification of the improved supporting means for the harvester platform; and Figure 5 is an enlarged transverse sectional view taken substantially on the line 5—5 of Figure 4.

The principles of the present invention may be suitably embodied in various forms and it will be, therefore, appreciated that the following description and illustration of the invention are only representative and not limiting.

The harvesting machine shown in Figure 1 includes a generally transverse harvester platform structure 10 having a transverse front frame member 11 and a transverse rear frame member 12. The harvesting mechanism, generally indicated at 13, is carried at the front edge of the platform structure and includes a sickle 14 and guards 15. The grassward end of the platform carries the usual divider 16.

The platform is mounted adjacent its rear edge on a transverse support in the form of a torsion-tube 17. The grassward end of the tube is carried on wheel structure 18. This structure includes frame members 19 extending under and secured to the platform structure 10, and a supporting wheel 20 carried on a transverse stub axle 21. The platform structure and frame structure 18 are suitably braced by braces 22. The stubbleward end of the tube 17 is carried on supporting structure 23 very similar to the structure 18. This structure includes a supporting wheel 24 carried on a transverse axle 25, and frame members 26 extend from the axle forwardly under an extension 27 of the platform structure 10.

An inside divider 28 is located between the platform structure 10 and its extension 27. Frame members 29 are connected between the platform structure 10 and the extension 27 to provide structure at the stubbleward end of the platform for connection to a forwardly extending hitch 30. The hitch is connected to the framework 29 for pivotal movement with respect thereto generally about a transverse axis provided by pivot pin connections 31. A conventional form of hand lever 32 is provided for the purpose of adjusting the relationship between the hitch 30 and the platform 10.

The inner and outer ends of the platform are provided with suitable supports 33 for supporting a transverse harvester reel 34. The reel includes a shaft 35, at the inner or stubbleward end of which is keyed a driving sprocket 36. The structure just described may be generally conventional and has therefore been illustrated rather schematically.

The axle 25 of the ground wheel 24 drives a sprocket 37 which, through a driving chain 38, drives a sprocket on an intermediate shaft 39. A second sprocket on the shaft 39 is connected by a drive chain 40 to the sprocket 36 on the reel shaft 35. This mechanism provides a ground drive for the reel 34.

The harvester may be drawn by a tractor or other vehicle having a power source, such as a power take-off. In such case, the power take-off, not shown, has adapted for connection thereto a longitudinally extending power shaft 41 connected by a universal joint 42 to a crank-shaft 43 supported by the platform extension 37. A pitman 44 is connected between the crank-shaft 43 and the sickle 14 of the harvesting mechanism 13. The sickle is thus power driven.

The platform 10 includes laterally running conveyer means comprising a transverse endless apron 45 carried on and trained about a longitudinal roller 46 at the grassward end of the platform. A second roller 47, paralleling the roller 46, is journaled in bearings 48 and 49, carried respectivey by the front and rear frame members 11 and 12 of the platform structure 10 (see Figure 3). As best shown in Figure 1, the roller 47 is located a substantial distance grasswardly of the stubbleward end of the platform structure. Thus, the apron 45 does not extend entirely across the harvester platform as is the case in most conventional harvesters. Material thus harvested by the harvesting means 13 is delivered laterally toward the stubbleward end of the platform. According to the present invention, means are provided for receiving the harvested material and for discharging said material rearwardly, preferably over and rearwardly of the torsion-tube 17 and between the supporting wheels 20 and 24.

As best shown in Figures 1 and 3, the discharge means comprises a longitudinally running, endless conveyer or apron 50 carried on and trained about a front roller 51 and a rear roller 52. The front roller is journaled in the platform structure 10 closely adjacent the transverse frame member 11. The rear roller 52 is carried on a transverse shaft 53 located rearwardly of the torsion-tube 17. This shaft is journaled in brackets 54 and 55 extending rearwardly of and secured to the platform structure 10 and/or the torsion-tube 17. It will be noted from an examination of Figure 3 that the roller 52 is so located and is of such size that the apron 50 has its upper run passing over the torsion-tube and its lower run passing under the torsion-tube. Therefore, harvested material delivered to the rearwardly running apron 50 by the laterally running apron 45 is delivered in a rearward direction to be deposited or discharged upon the ground rearwardly of the torsion-tube 17 and between the wheels 20 and 24. The discharge of material in this fashion provides for the proper forming of windrows. A longitudinally running end plate 56 is disposed at the stubbleward side of the apron 45, so that grain or other material discharged onto the apron 50 by the apron 45 butts against the plate to be arranged for discharge in such manner that the heads of the grain dispose themselves at the upper portions of the windrow. This provides for the proper drying of the grain before it is gathered or picked up.

Another important characteristic of the present invention is the means for driving the aprons 45 and 50. As best shown in Figures 1 and 2, the grassward wheel 20 drives a sprocket 57 which, through the medium of a driving chain 58, drives a sprocket 59 carried on a shaft 60 journaled in a supporting plate 61. The plate 61 is rigidly carried by the platform structure 10 and the supporting structure 18. The shaft 60 is associated with slip clutch mechanism 62 for a purpose to be described subsequently.

The plate 61 has journaled therein an upper shaft 63 and a lower shaft 64. The shaft 63 carries a pinion 65, and the shaft 64 carries a pinion 66, both of which mesh with and are driven by a gear 67 on the shaft 60. The upper shaft 63 is connected by a universal joint to a transversely extending shaft 68 generally paralleling a rear wall portion 69 of the platform structure 10. The other end of the shaft 68 is connected by a universal joint to a stub shaft 70 journaled in a bracket 71 carried upon a rear portion of the platform structure. A bevel gear 72 on the shaft 70 meshes with and drives a bevel gear 73 that is connected with and drives the inner roller 47 of the platform 45.

The lower shaft 64 is connected by a universal joint to a shaft 74, this shaft generally paralleling the shaft 68. The other end of the shaft 74 is connected by a universal joint to the shaft 53 that carries the rear roller 52 of the apron 50. In this manner the aprons 45 and 50 are driven from the outside ground wheel 20. The slip clutch 62, associated with the driving shaft 60, provides for the necessary slippage in the event that some portion of the driving mechanism becomes overloaded. The slip clutch functions also to prevent driving of the shafts 68 and 74 when the wheel 20 rotates rearwardly, as when the harvester is turned to the right.

As previously stated, the platform structure includes a rear wall portion 69. This is generally conventional construction. In the present case, however, the wall 69 is only coextensive with the apron 45 and terminates thereat to provide a discharge opening at the rear of the machine through which the apron 50 discharges harvested material, as set forth above.

In the modified form of the invention shown in Figures 4 and 5, the harvester is provided with an improved supporting means for the platform. This form of the invention also embodies mechanism by means of which the entire harvesting mechanism may be power driven from the power source of the draft vehicle.

The harvester shown in Figure 4 includes a platform structure 80 provided with a transversely running apron 81. The platform includes a front frame member 82 and a rear frame member 83, and is supported on a transverse supporting member in the form of a torsion-tube 84. In the present instance, the tube 84 is located intermediate the front and rear frame members 82 and 83 of the platform, so that the platform structure is substantially torsionally balanced on the tube. The inner end of the tube is connected to frame structure 85 supported on a ground wheel 86. The frame structure 85 and platform structure are suitably connected to the platform 80 for the proper support thereof.

A hitch 87 is connected to the platform structure in much the same manner as the hitch 30 of the previously described construction.

A harvester reel 88, including a shaft 89, is suitably supported on a support 90 at the inner end of the harvester platform structure. It will be understood that the outer end of the reel is similarly supported and also that the outer end of the platform structure is carried on the torsion-tube 84 and a ground wheel similar to the ground wheel 86. A power shaft 91, similar to the power shaft 41 previously described, is connected by a universal joint to a shaft 92. This shaft extends longitudinally of the platform structure and is rotatably carried thereby. The forward portion of the shaft 92 includes a crank 93 that is connected to a pitman 94. The pitman is connected to and reciprocates a sickle 95 of harvesting mechanism 96. The rear end of the shaft 92 is associated with suitable gearing, not shown, in a gear-box 97 at the rear of the machine. This results in the driving of a transverse shaft 98 located just ahead of the wheel 86. The shaft 98 carries a sprocket that drives a drive chain 99 which in turn drives a sprocket on the reel shaft 89. The construction thus far described differs from that previously described in the supporting of the platform and in the driving of the reel by power.

The platform structure carries front and rear rollers 100 and 101 of a rearwardly running apron 102. This apron and its relationship to the apron 81 is similar to the apron 50 and its relationship to the apron 45, previously described. The roller 101 is carried on a shaft 103 rearwardly of and paralleling the transverse driving shaft 98. The roller is so located and of such size that the apron 102 has its upper run passing over and its lower run passing under both the shaft 98 and the torsion-tube 84. The torsion-tube carries a bracket 104 on which is journaled an idler roller 105 for the purpose of maintaining the lower run of the apron 102 away from the torsion-tube 84.

The apron 81 includes an inner roller 106 having at its rear end a bevel pinion 107. A bracket 108 journals therein a stub shaft 109 having at one end thereof a bevel pinion 110 and at its other end a driving pulley 111. The grassward end of the shaft 103 of the roller 101 carries a similar driving pulley 112, and the grassward end of the shaft 98 also carries a driving pulley 113. A driving belt 114 is trained about the pulleys 111, 112, and 113. Thus, the aprons 81 and 102 are power driven by the power shaft 91 through the medium of the shafts 92 and 98.

Other details of construction of the modification just described are similar to those of the construction shown in Figures 1, 2, and 3.

It will be seen from the foregoing description that improved harvester constructions have been provided. As stated above, the important features consist in the means for discharging harvested material over and rearwardly of the support for the harvester platform, the driving means for the moving parts of the machine, and the improved supporting means of the harvester platform. Various other details of construction and modifications will undoubtedly suggest themselves to those skilled in the art; however, it is not intended by the disclosure to limit the scope of the invention.

What is claimed is:

1. For a harvester having a pair of transversely spaced supporting wheels, a transversely disposed torsional support carried by the wheels, a platform carried forwardly of and by said support, harvesting means at the forward end of the platform, and a transversely running apron on the platform between the harvesting means and the support for receiving cut crops from the harvesting means and disposed to convey said crops transversely, a longitudinal, rearwardly running endless apron disposed to receive crops from the first apron and arranged with its upper run passing over and rearwardly of the torsional support and its lower run passing below the support, whereby crops will be discharged over the support and upon the ground rearwardly of the support.

2. For a harvester having a pair of transversely spaced supporting wheels, a transversely disposed torsional support carried by the wheels, a platform mounted substantially centrally thereof on said torsional support, harvesting means on the forward end of the platform, and a transversely running apron behind the harvesting means and over the support for receiving cut crops from the harvesting means and disposed to convey said crops transversely toward one of the supporting wheels, a longitudinal, rearwardly running endless apron disposed adjacent and laterally inside the aforesaid supporting wheel to receive crops from the first apron and arranged with its upper run passing over and rearwardly of the torsional support and its lower run passing below the support, whereby crops will be discharged over the support and upon the ground rearwardly of the support and laterally inside said supporting wheel.

3. In a harvester: a pair of transversely spaced supporting wheels; a transverse harvester platform, including harvesting means, disposed ahead of the wheels; a transversely disposed torsional support carried by the wheels; and means mounting the platform on the support substantially equidistant between its transverse sides, whereby it is torsionally balanced with relation to the support.

4. In a harvester: a pair of transversely spaced supporting wheels; a transverse harvester platform, including harvesting means, disposed ahead of the wheels; a transverse torsional support carried by the wheels and disposed beneath the platform; and means mounting the platform above and in substantially torsionally balanced relation on the support.

5. In a harvester: a pair of transversely spaced supporting wheels; a transverse harvester platform, including harvesting means, disposed ahead of the wheels; a transversely disposed torsional support carried by the wheels; means mounting the platform on the support substantially midway of the front and rear sides of the platform, whereby it is torsionally balanced with relation to the support; a transversely running apron on the platform to receive cut crops from the harvesting means; and longitudinally running means disposed to receive crops from the apron and arranged to discharge said crops over and rearwardly of the support.

6. For a harvester having a transverse, generally horizontal platform, harvesting means ahead of the platform, conveyor means running transversely of the platform to receive cut crops from the harvesting means and to convey said crops toward one side of the platform and to discharge said crops thereat, and a transverse support at the rear of and generally in the horizontal plane of the platform: means for receiving crops from the conveyor means, comprising a first roller rotatable on a transverse axis adjacent the harvesting means and at the discharge end of the conveyor means, a second roller rotatably carried by the support at the rear thereof on an axis paralleling that of the first roller, and an endless apron trained about the rollers with the support between the upper and lower runs thereof.

7. In a harvester: a pair of ground wheels; a transverse platform structure carried by the wheels; harvesting means ahead of the platform structure; transversely running conveyor means behind the harvesting means to receive crops from the harvesting means and comprising a pair of transversely spaced, longitudinally disposed rollers and an endless apron trained thereabout; a transverse support at the rear of the platform structure; a rearwardly running conveyor means disposed to receive crops from the first conveyor means and comprising front and rear transversely disposed rollers and an endless apron trained thereabout; means mounting the rear of said rollers on the transverse support; power transmission means carried by the platform structure; drive means connecting a ground wheel and the transmission means; a drive shaft generally paralleling the transverse support and connecting the transmission means and the rear roller of the second conveyor means; and drive means connecting the transmission means and one of the rollers of the first conveyor means.

8. In a harvester: a pair of ground wheels; a transverse platform structure carried by the wheels; harvesting means ahead of the platform structure; transversely running conveyor means behind the harvesting means to receive crops from the harvesting means and including a longitudinal shaft projecting at the rear of the platform structure; a rearwardly running conveyor means disposed to receive crops from the first conveyor means and including a shaft at the rear of the platform structure; power transmission means carried by the platform structure; drive means connecting a ground wheel and the transmission means; and a pair of drive shafts at the rear of and paralleling the platform structure and connecting the transmission means and the aforesaid conveyor means shafts.

9. For a harvester having a pair of transversely spaced supporting wheels, a transversely disposed torsional support carried by the wheels, a platform mounted substantially centrally thereof on said torsional support, harvesting means on the forward end of the platform, and a transversely running apron behind the harvesting means and over the support for receiving cut crops from the harvesting means and disposed to convey said crops transversely toward one of the supporting wheels, a longitudinal, rearwardly running endless apron disposed adjacent and laterally inside the aforesaid supporting wheel to receive crops from the first apron and arranged to feed over and rearwardly of the torsional support, whereby crops will be discharged over the support and upon the ground rearwardly of the support and laterally inside said supporting wheel.

10. In a harvester: a pair of transversely spaced supporting wheels; a transverse harvester platform, including harvesting means; a transversely disposed torsional support carried by the wheels; and means mounting the platform on the support substantially equidistant between its transverse sides, whereby it is torsionally balanced with relation to the support.

11. In a harvester: a pair of transversely spaced supporting wheels; a transverse harvester platform, including harvesting means; a transversely disposed torsional support carried by the wheels; means mounting the platform on the support substantially midway of the front and rear sides of the platform, whereby it is torsionally balanced with relation to the support; a transversely running apron on the platform to receive cut crops from the harvesting means; and longitudinally running endless conveyor means disposed to receive crops from the transversely running apron and constructed and arranged to discharge said crops over and rearwardly of the support.

12. In a harvester having a pair of transversely spaced supporting wheels, a transversely disposed tube carried by the wheels, a platform substantially torsionally balanced on said tube, harvesting means on the forward end of said platform, a transversely running cut-crop endless conveyer positioned behind said harvesting means, and a longitudinally extending rearwardly running endless conveyer positioned at one end of said transversely running conveyer, whereby the cut crops are received and carried rearwardly by the rearwardly running conveyer.

13. In a harvester having a pair of transversely spaced supporting wheels, a transversely disposed tube carried by the wheels, a platform torsionally carried by said tube, harvesting means on the forward end of said platform, a transversely running cut-crop endless conveyer positioned behind said harvesting means, and a longitudinally extending rearwardly running endless conveyer positioned at one end of said transversely running conveyer, the upper flight of said rearwardly running conveyer positioned above said tube and the lower flight of said rearwardly running conveyer positioned below said tube, whereby the cut crops are received and carried rearwardly by the upper flight of the rearwardly running conveyer.

ARNOLD E. W. JOHNSON.
HELMA KATHERINE CRUMB,
Administratrix of the Estate of Charles F. Crumb, Deceased.

REFERENCES CITED

The following references are of record in the file of this patent:

UNITED STATES PATENTS

| Number | Name | Date |
| --- | --- | --- |
| 796,268 | Troeger | Aug. 1, 1905 |
| 2,281,059 | Anderson et al. | Apr. 28, 1942 |
| 2,320,134 | Huddle | May 25, 1943 |